United States Patent [19]

Mathis et al.

[11] Patent Number: 4,732,257

[45] Date of Patent: Mar. 22, 1988

[54] CONTINUOUS VARIABLE-SPEED TRANSPORT APPARATUS

[75] Inventors: Daniel Mathis, Sautron; Pierre Patin, Paris, both of France

[73] Assignee: Regie Autonome des Transports Parisiens, France

[21] Appl. No.: 921,096

[22] Filed: Oct. 21, 1986

[30] Foreign Application Priority Data

Oct. 21, 1985 [FR] France ................................ 85 15591

[51] Int. Cl.[4] ................................ B65G 21/12

[52] U.S. Cl. ................................ 198/334; 198/792; 104/25

[58] Field of Search ................... 198/334, 792; 104/18, 104/25

[56] References Cited

U.S. PATENT DOCUMENTS

| | | | |
|---|---|---|---|
| 3,516,363 | 6/1970 | Van Der Wal | 198/792 |
| 3,565,238 | 2/1971 | Candela | 104/25 X |
| 3,665,863 | 5/1972 | Patin | 198/792 X |
| 3,672,484 | 6/1972 | Angioletti et al. | 198/334 |
| 3,834,520 | 9/1974 | Patin | 198/334 |
| 3,884,152 | 5/1975 | Emeriat | 198/334 X |
| 4,053,044 | 10/1977 | Patin | 198/334 |
| 4,267,922 | 5/1981 | Patin et al. | 198/334 X |
| 4,284,191 | 8/1981 | Lavau | 198/334 X |

FOREIGN PATENT DOCUMENTS 468292 3/1969 Switzerland .

*Primary Examiner*—Robert J. Spar

*Assistant Examiner*—D. Glenn Dayoan

*Attorney, Agent, or Firm*—Franklin D. Wolffe; Morris Fidelman

[57] ABSTRACT

The invention relates to continuous transport apparatus whose transport speed is variable. The embodiment illustrated is a moving walkway in which the load-bearing members are plates, adjacent plates overlapping to present a continuous surface. The load-bearing members are mounted on respective supports and the variation in speed is obtained by varying the spacing between adjacent supports. The supports are connected by a flexible link, which is a chain or belt in the preferred embodiment. The link passes round angle-changing members such as pulley or pinion wheels which are mounted slidably on the supports for movement perpendicular to the track, so that the spacing between the angle-changing members on a given support perpendicular to the track controls the spacing along the track between the support and the adjacent support to which it is connected by the flexible link, the positions of the angle-changing members being controlled by guide rails extending along the track, whose spacing thus defines the transport speed in the corresponding zone of the track. In accordance with the invention, the adjacent supports are also connected by a further link which, in the described embodiments comprises a scissors having rigid arms so that at the maximum speed, where the spacing between the supports is maximum, the scissors is at its maximum opening and the flexible link is slackened and the scissors takes the strain.

11 Claims, 5 Drawing Figures

CONTINUOUS VARIABLE-SPEED TRANSPORT APPARATUS

BACKGROUND OF THE INVENTION

This invention relates to continuous transport apparatus whose transport speed is variable.

The invention is particularly, but not exclusively, applicable to a variable-speed moving walkway comprising a series of loads bearing members such as plates disposed along a continuous track including a transport path and a return path, with adjacent members overlapping, the load-bearing members being mounted on respective guided supports. The speed variation is obtained by varying the spacing of adjacent supports; each pair of adjacent supports is connected together by a respective flexible inextensible link, for example a chain or belt, which extends in a loop round angle-changing members such as pinion wheels or pulley wheels on the supports, the spacing of the angle-changing members on the same support being adjusted perpendicularly to the direction of transport so as to cause a corresponding inverse variation in the spacing of the adjacent supports parallel to the transport direction. The angle-changing members engage guide rails which extend along the track and whose spacing varies to vary the spacing of the angle-changing members on the same support and hence vary the support spacing and transport speed.

Such an apparatus may take the form of a variable speed walkway in which the transport speed is slow in the access and exit zones and is fast along the majority of the path in between. The apparatus may be driven by a motor acting on a few supports at a time in the high speed zone.

DESCRIPTION OF THE PRIOR ART

Apparatus of this kind is described in French Pat. Nos. 2 190 690 and 2 202 828. The entire tension is taken by the flexible links which are inextensible in principle. In practice however, the residual elasticity of the flexible link and its wear are not insignificant: a chain may experience length variation of the order of 2% in the course of its life. Accordingly, the connection between adjacent supports is not achieved with strict geometrical accuracy. The inaccuracy is particularly problematic in the high-speed zones, especially in the vicinity of the drive, since the spacing between supports is not maintained precisely and the drive forces are consequently no longer spread evenly over several adjacent supports.

In addition, during braking of the supports, the residual elasticity of the flexible links between adjacent supports enables a longitudinal wave which is propagated with increasing amplitude in the braking zone so that brake means have to be added to damp out the longitudinal wave and avoid associated problems.

OBJECTS OF THE INVENTION

An object of the invention is to provide a variable speed continuous transport apparatus of the kind referred to in which the spacing between adjacent supports is maintained more precisely in the high-speed zones.

Another object of the invention is to provide such an apparatus in which the drive forces are spread more evenly over several supports in the vicinity of the drive means.

Yet another object of the invention is to improve safety in the event of breakage of a flexible link.

Still another object of the invention is to reduce wear of the flexible links.

BRIEF DESCRIPTION OF THE INVENTION

The present invention provides a transport apparatus comprising a series of load-bearing members extending along a continuous track, which includes a transport path, a series of spaced support members for supporting said load-bearing members, connection means comprising a series of flexible, substantially inextensible link means connecting each pair of adjacent support members respectively, angle-changing means on said support members bending said flexible means and guide means disposed along said disposed along said track for varying and controlling the positioning of said angle-changing means relative to the respective support member laterally of said track whereby to vary and control the spacing of said support member relative to the adjacent support member along said track and hence to vary and control the transport speed of said support and load-bearing members, wherein said connection means also includes at least one further link means between each respective adjacent pair of support members, said further link means comprising first and second rigid arms connected to respective adjacent support members and hinged together whereby to accommodate variation in the spacing of said adjacent support members along said track, said further link means defining a maximum spacing between the adjacent support members such as to slacken said flexible link means at least partially in high speed zones of said track.

The further link means provides a rigid mechanical link between the adjacent support members in the high speed zones, so that the relative positioning of the support members is precise and the drive forces can more readily be spread over several support members in the vicinity of the drive.

Advantageously, said further link means includes hinge means enabling relative displacement of said arms in a plane parallel to the track as the spacing between said support members varies and also relative displacement in a longitudinal plane perpendicular to the track. This accommodates changes of scope of the track. Preferably, the hinge means includes a ball and socket joint.

In a preferred embodiment of the invention, at least said first arm of each of said further link means comprises a projection extending beyond the hinge and cooperating with said second arm to form abutment means limiting opening of said link means at said maximum spacing of said adjacent support members. This improves further the precise definition of the maximum spacing between the adjacent supports. Preferably, said abutment means presents planar contact surfaces between said first and second arms.

Advantageously, each said connection means includes a plurality of said further link means between each adjacent pair of supports. The use of two further link means reinforces the connection between the supports. Preferably, the two further link means are disposed in off-set planes, to reduce the space occupied thereby.

DESCRIPTION OF THE DRAWINGS

Other features of the invention will appear from the following description given by way of example, with reference to the accompanying drawings, in which.

DESCRIPTION OF THE PREFERRED EMBODIMENTS OF THE INVENTION

Figure 1:
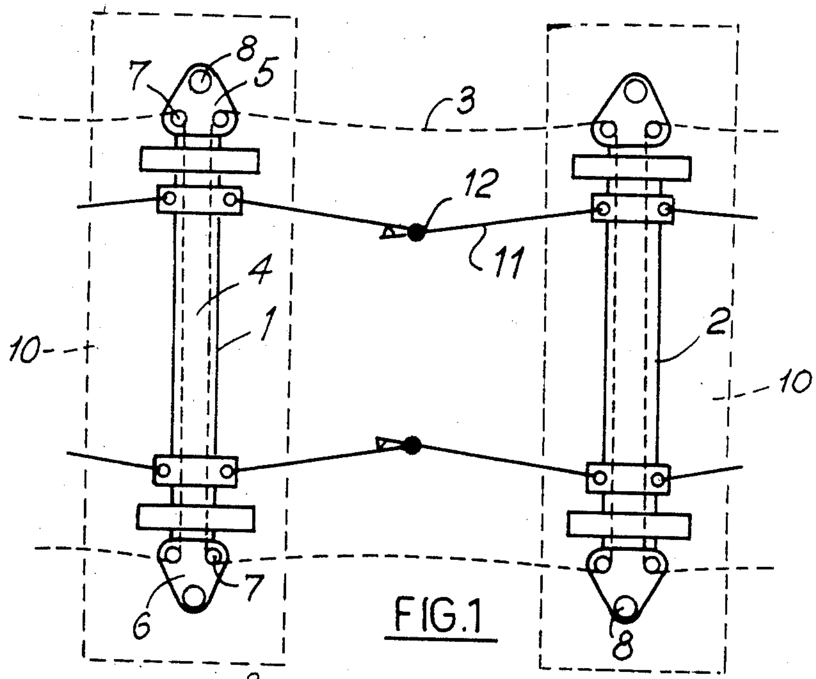
FIGS. 1 and 2 are simplified diagrammatic plan views of support means in a transport apparatus in accordance with an embodiment of the invention.
Figure 2:
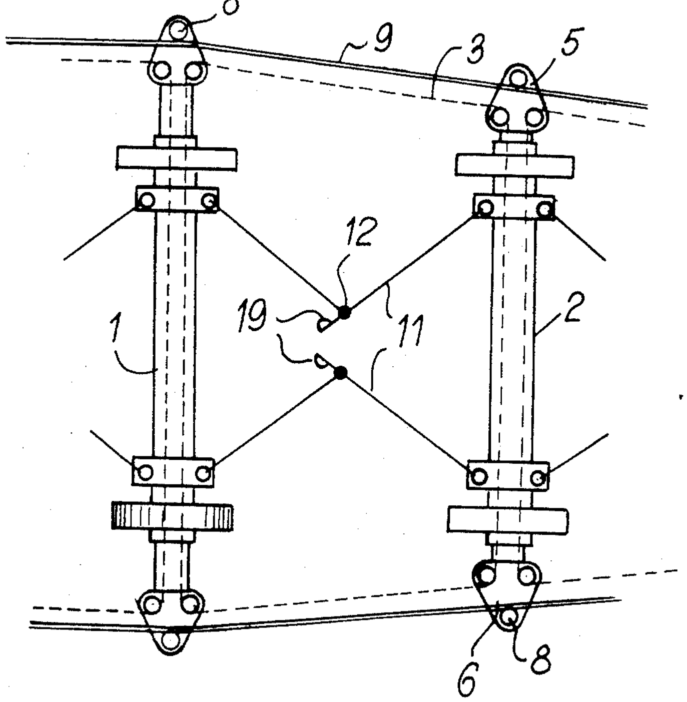

Referring first to FIGS. 1 and 2, the transport apparatus of this embodiment of the invention comprises plates 10 (shown in dashed lines) on which the material or people to be transported are carried, the plates being mounted on support members such as the two neighbouring support members 1 and 2. The support members 1 and 2 are connected by a suitable inextensible flexible link 3 comprising, in this example, a chain in an endless loop. Each support comprises, like the support 1, a tube 4 through which pass the flexible links 3 and whose ends are provided with guide heads 5 and 6 respectively. The guide heads 5 and 6 are mounted slidingly in the tube 4 and bear angle-changing members comprising pulley wheels 7, there being two such pulley-wheels 7 on each head 5 or engaging respectively the two chains 3 extending through the tube 4 and guiding the chains 3 towards respective ones of the neighbouring supports. Each head 5 or 6 also bears a roller 8 which rolls along a guide track 9 as shown in FIG. 2. Each support pulls the following support through the rearwards link 3, so that the link is stretched (but not extended) in the shape of a trapezium of constant perimeter and variable bases. When the base lengths of the trapezium are maximum, the heads 5 and 6 are spaced apart, to the maximum of the tube 4, the supports 1 and 2 being brought closest together and their speed of movement being slowest; on the contrary, when the heads 5 and 6 are entered fully into the tube 4, the base lengths of the trapeze are minimum and the supports are spaced apart a maximum distance, so that the zone is traversed at maximum speed.

A known apparatus of this kind is described in French Pat. No. 2 202 828 and may form a moving walkway of variable speed, for example. The walkway is formed by the plates (not shown) which overlap and are mounted at one end on support such as 1 or 2. In the low speed zones, the plates overlap almost completely, whereas in the high speed zones, the overlap is reduced to a small area.

In accordance with this embodiment of the invention, the neighbouring support members such as 1 and 2 are also connected by at least one freely hinged link 11, such as a "scissors". The two "points" of the scissors 11 are secured pivotingly to the neighbouring supports 1 and 2 respectively, the two arms of the scissors being hinged at their opposite ends, at 12. In accordance with this embodiment of the invention, in a high-speed zone, as shown in FIG. 1, the heads 5 and 6 are entered fully into the tubes 4, the scissors 11 are fully open and bear the tension between neighbouring supports; the guide tracks 9 are arranged to reduce the spacing of the heads 5 and 6 sufficiently for the chain 3 to be substantially relaxed.

Advantageously, the maximum opening of the scissors 11 is defined by an abutment 19 solid with one branch of the scissors and brought into engagement with the other branch. This enables the relative positions of the two supports 1 and 2 to be defined with precision and also avoids the scissors turning inside out.

The mechanical link 11 provided by the scissors offers a rigid and precise link in the high speed zones, whereby the relative positioning of the supports is precise, so that it is easier to spread the drive forces over several adjacent supports in the vicinity of the drive apparatus (not shown) of the moving walkway.

In addition, the scissors act as a safety device if a flexible link 3 breaks; thus, if the chain 3 breaks in any zone, whether a high or low speed zone, the neighbouring supports will still be linked by the scissors 11.

Figure 3:
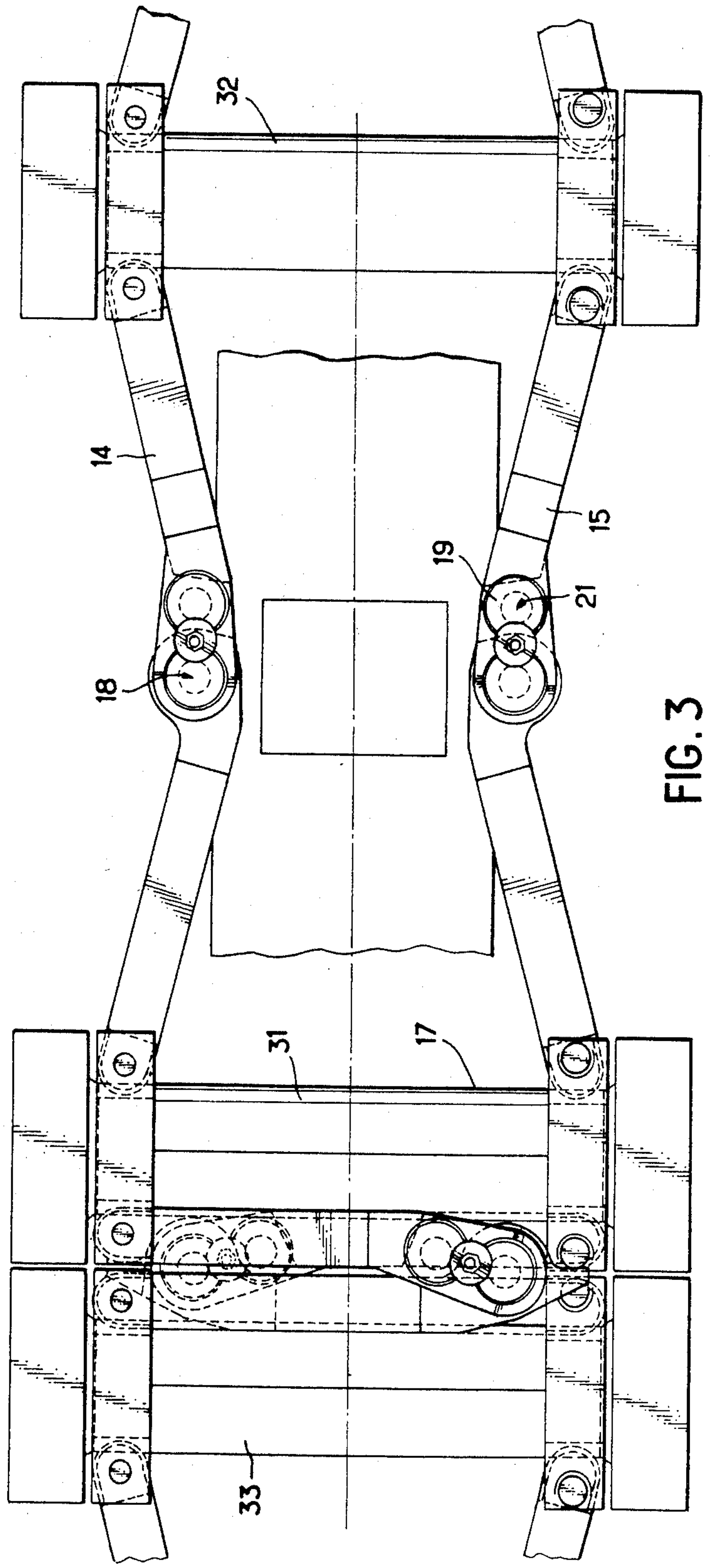
FIG. 3 is a detailed plan view of the support means.
Figure 4:
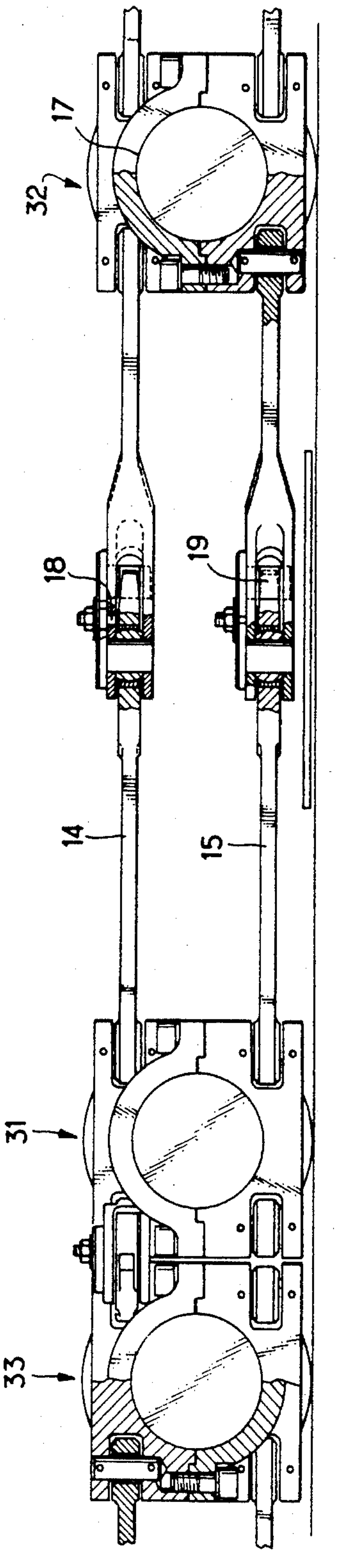
FIG. 4 is a detailed side view of the support means of FIG. 3.

FIGS. 3 and 4 show the structure of one preferred example of this embodiment of the invention. In the centre parts of these drawings, two supports 31 and 32 are shown in relative positions corresponding to a high speed zone, with maximum spacing between them and, in the left part of the drawings, a further support 33 is shown in its low speed position relative to support 31, with mimimum spacing.

As shown in FIGS. 3 and 4, advantageously two scissors 14 and 15 are provided between each pair of adjacent supports; the two scissors 14 and 15 are hinged to move in respective horizontal planes which are offset one above the other so as to allow the scissors to fold one above the other as shown in the left part of the drawings. This arrangement enables the space occupied by the two scissors to be reduced substantially to the same width as the tubes 17.

As shown particularly in FIG. 4, the hinge at the pivot 18 of each scissors 14 and 15 is such that it enables a small relative displacement of one branch relative to the other in the vertical plane; this arrangement accommodates bending of the walkway at a change of slope. This is particularly important in the case where the walkway forms a continuous loop. In particular, at the entrance and exit of the walkway, the plates descend below ground level and the walkway turns through 180° in its plane to return in the opposite direction. Advantageously, the hinge comprises a ball-joint.

Figure 5:
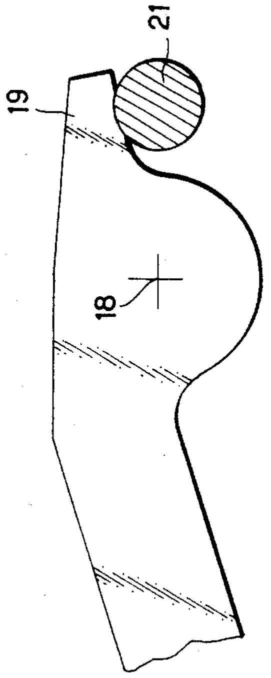
FIG. 5 is an enlarged scrap view showing abutment means in the apparatus of FIGS. 3 and 4.

As shown diagrammatically in FIGS. 1 and 2, and in more detail in FIG. 5, one branch of the scissors 11, 14 or 15 comprises an extension 19 projecting beyond the pivot 18; the extension 19 forms an abutment cooperating with a stop 21 on the other branch of the scissors. In this way, the maximum opening of the scissors is limited and enables the scissors to be closed without risk of jamming; in addition, this arrangement ensures good stability of the width of opening of the scissors 11, 14 or 15 in the high-speed zones, where it is the scissors which provides the link between adjacent supports.

Advantageously, the abutments 19 and 21 present mating surfaces whose contact areas are planar, which further increases the precision of the relative positioning of the two arms of the scissors in the high-speed zones and increases the rigidity of the link between the two adjacent supports.

The above description is given by way of illustrative example and is not limitative; it is clear that changes or variants of the apparatus described can be made within the scope of the present invention. For example, the number and position of the freely hinged links may be varied. Also, the invention is applicable to other continuous transport apparatus in which a link between adjacent support members is achieved by means of a flexible member such as a belt or cable. The flexible link may be an open loop instead of a closed loop, its ends then being secured to the support members and the shape outlined by the flexible link may be different from the trapezium described and is not necessarily a quadrilateral.

We claim:

1. A transport device, comprising:

a track which extends across a transport path;

a plurality of support members spaced along said track;

a plurality of load-bearing members supported on said support members;

connection means comprising a plurality of flexible, substantially inextensible first link means which connect each pair of adjacent support members, angle-changing means mounted on each of said support members for bending said first link means, and guide means disposed along the track for varying and controlling the positoning of said angle-changing means relative to its respective support member, said guide means being adapted to move the angle-changing means of each support member between a high-speed position, where the distance between adjacent support members is a maximum, and a low-speed position, where the distance between adjacent support members is a minimum;

wherein said connection means further comprises a second link means for connecting adjacent pairs of support members, said second link means comprising first and second rigid arms which are connected at one end to respective adjacent support members and hingedly connectd to each other so that the first and second arms pivot with respect to each other when the distance between adjacent support members is varied, wherein said second link means defines the maximum distance between adjacent support members so as to at least partially slacken the first link means when the angle-changing means is in said high-speed position.

2. A transport device as claimed in claim 1, wherein said load-bearing members comprise a plate connected to each support member, adjacent plates overlapping to define a walkway.

3. A transport device as claimed in claim 1, wherein said track defines a plane and said second link means further comprises hinge means for hingedly connecting the first and second arms to each other, said hinge means enabling relative displacement of the first and second arms in a plane essentially parallel to the plane of the track and also enabling relative displacement of the first and second arms in a direction perpendicular to the plane of the track.

4. A transport device as claimed in claim 3, wherein said hinge means comprises a ball and socket joint.

5. A transport device as claimed in claim 1, wherein said second link means comprises an abutment means for limiting opening of the second link means when the angle-changing means is in said high-speed position, said abutment means comprising a projection attached to at least the first arm of the second link means to cooperate with the second arm of the second link means.

6. A transport device as claimed in claim 5, wherein said abutment means presents planar contact surfaces between said first and second arms.

7. A transport device as claimed in claim 1, wherein said connection means comprises a plurality of said second link means between each adjacent pair of supports.

8. A transport device as claimed in claim 7, wherein said track defines a plane and the first and second arms of said second link means are displacable relative to each other in a plane essentially perpendicular to the plane of the track, wherein between adjacent pairs of supports the plurality of said second link means are displacable in a plane offset to each other so that the second link means can overlap when the angle-changing members is in the low-speed position.

9. A transport device as claimed in claim 2, wherein said track defines a plane and said second link means further comprises hinge means for hingedly connecting the first and second arms to each other, said hinge means enabling relative displacement of the first and second arms in a plane essentially parallel to the plane of the track and also enabling relative displacement of the first and second arms in a direction perpendicular to the plane of the track.

10. A transport device as claimed in claim 2, wherein said second link means comprises an abutment means for limiting opening of the second link means when the angle-changing means is in said high-speed position, said abutment means comprising a projection attached to at least the first arm of the second link means to cooperate with the second arm of the second link means.

11. A transport device as claim 2, wherein said connection means comprises a plurality of said second link means between each adjacent pair of supports.

* * * * *

UNITED STATES PATENT AND TRADEMARK OFFICE

CERTIFICATE OF CORRECTION

PATENT NO. : 4,732,257

DATED : March 22,1988

INVENTOR(S) : Daniel Mathis and Pierre Patin

It is certified that error appears in the above-identified patent and that said Letters Patent is hereby corrected as shown below:

Title page:

The Assignee should read:

[73] Assignee: Regie Autonome des Transports Parisiens, Alsthom, Of France --.

Signed and Sealed this

Twenty-ninth Day of November, 1988

*Attest:*

DONALD J. QUIGG

*Attesting Officer* *Commissioner of Patents and Trademarks*